United States Patent [19]
Cleri, Jr.

[11] Patent Number: 5,651,331
[45] Date of Patent: Jul. 29, 1997

[54] PET ESCAPE DEVICE

[76] Inventor: Carl J. Cleri, Jr., 67 Surf Ave., Warwick, R.I. 02889

[21] Appl. No.: 693,990

[22] Filed: Aug. 8, 1996

[51] Int. Cl.$^6$ .............................. A01K 1/03; A01K 1/035
[52] U.S. Cl. ................................................ 119/484
[58] Field of Search .................... 119/501, 484, 119/772

[56] References Cited

U.S. PATENT DOCUMENTS

| | | | |
|---|---|---|---|
| 4,022,263 | 5/1977 | Beckett et al. | 119/484 X |
| 4,216,743 | 8/1980 | Cohen | 119/484 |
| 5,072,544 | 12/1991 | Breck, Jr. | 119/484 X |
| 5,148,767 | 9/1992 | Torchio | 119/484 |
| 5,216,350 | 6/1993 | Vavrek | 119/484 |

*Primary Examiner*—Thomas Price
*Attorney, Agent, or Firm*—Robert J. Doherty

[57] ABSTRACT

An escape device for pets including a passageway opening from the inside of the enclosure to the outside thereof which passageway is normally closed by a primary door and an apparatus is provided for opening such door at the onset of a smoke emitting emergency such as a fire such that the door is open for safe egress for the pet or pets. In addition, a pre-recorded message preferably in the owner's voice directing and/or commanding the pet or pets to the open passageway is provided.

9 Claims, 5 Drawing Sheets ns5,651,331

PET ESCAPE DEVICE

BACKGROUND OF THE INVENTION

This invention relates to an escape device for pets, primarily dogs and cats but including other animals especially those that are trainable to voice command. Such pets are normally housed within an enclosure such as one's house and thus are subject to smoke emitting emergencies such as fire within such enclosures and especially so when the owners are not present when such an emergency occurs. Also due to the chaotic conditions that normally accompany such fires or other smoke emitting emergencies, pets may not be the first order of priority with the owners of such enclosures thus subjecting the pets to danger of asphyxiation or burning. On the other hand, some owners are so concerned with their pets that they may enter a burning or smoke filled building in an attempt to rescue them thus so additionally endangering the owners.

OBJECTS AND SUMMARY OF THE INVENTION

Accordingly, in light of the above, there is a need for a device which will provide for the safe egress from the enclosure in event of a smoke emitting emergency that is solely directed to pets, thus not only providing for the needs of such pets but additionally, at least to some extent, relieving the potentially distracting attention given to such pets during such emergencies by their owners.

Accordingly, a primary object of the present invention is the provision of a pet escape device solely adapted for use by pets and automatically activated upon a smoke emitting emergency such that the pets may gain egress to the outside of the enclosure without active help from their owners.

A further object of the present invention is the provision of such as above-described pet escape device that additionally increases the chance of the pet successfully using the escape device by taking advantage of the pet's ability to recognize voice commands and urgings especially by its owner by playing a pre-recorded message proximal to such escape device upon its activation during a smoke emitting emergency.

These and other objects of the present invention are accomplished by the provision of an escape device for pets housed within an enclosure such as a house upon the occasion of a smoke emitting emergency such as a fire in such enclosure and wherein the enclosure is defined by a plurality of walls and wherein one of the walls includes an open passage therethrough disposed at a height and dimensioned so as to accommodate the passage therethrough of a pet including cats and dogs from said enclosure to the outside thereof, said device comprising a door normally positioned so as to close said open passage, opening means to open said door, a smoke detector operatively associated with said door opening means such that upon sensing smoke from the smoke emitting emergency said detector further activates said door opening means to open said door and enable the free egress of the pet through the passageway to the outside of the enclosure and means for playing a pre-recorded audible voice message from a person familiar to the pet upon the activation of said smoke alarm and said door opening means so as to urge the pet towards and through the open passageway.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
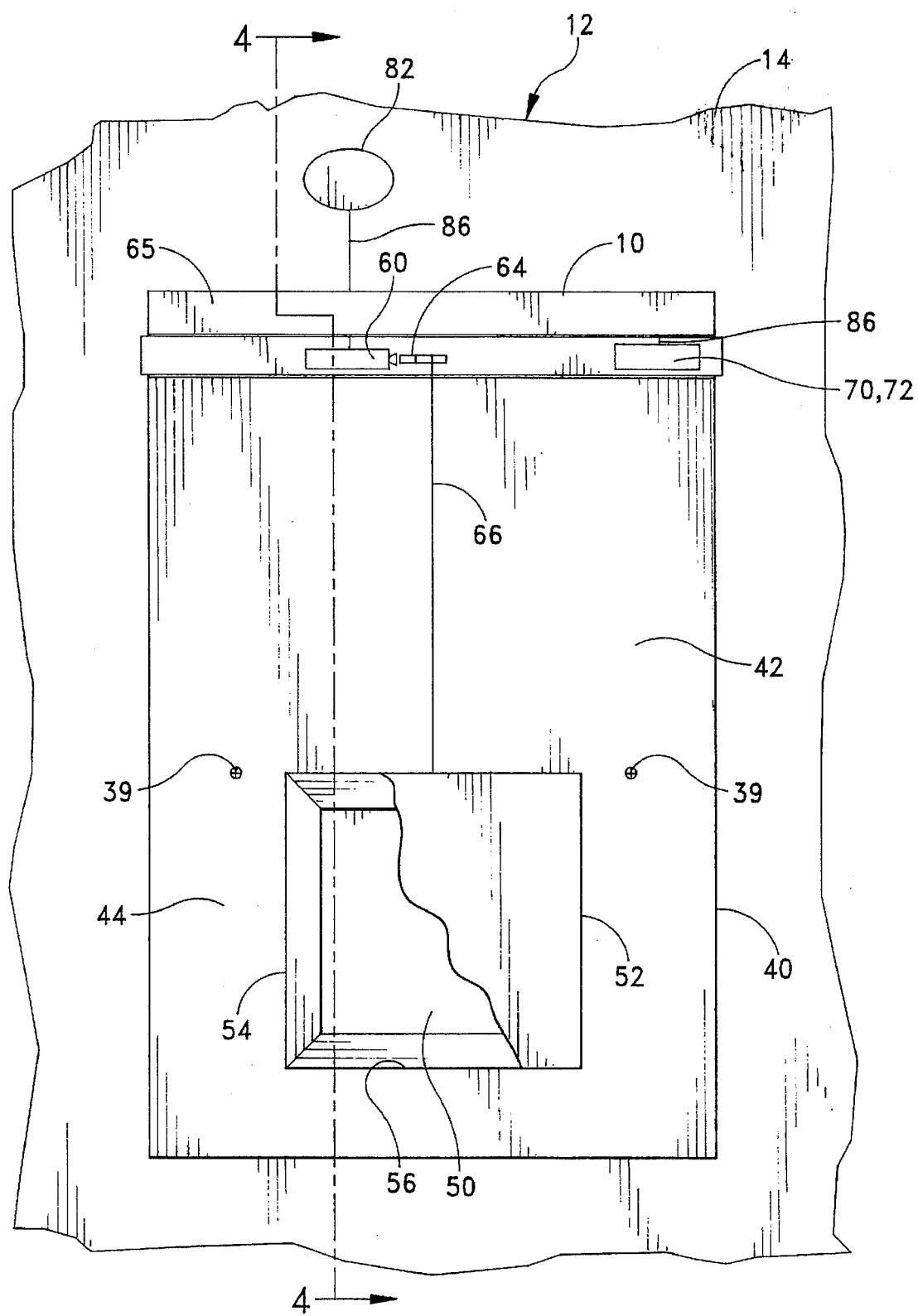
FIG. 1 is a front elevational view showing the device of the present invention.
Figure 2:
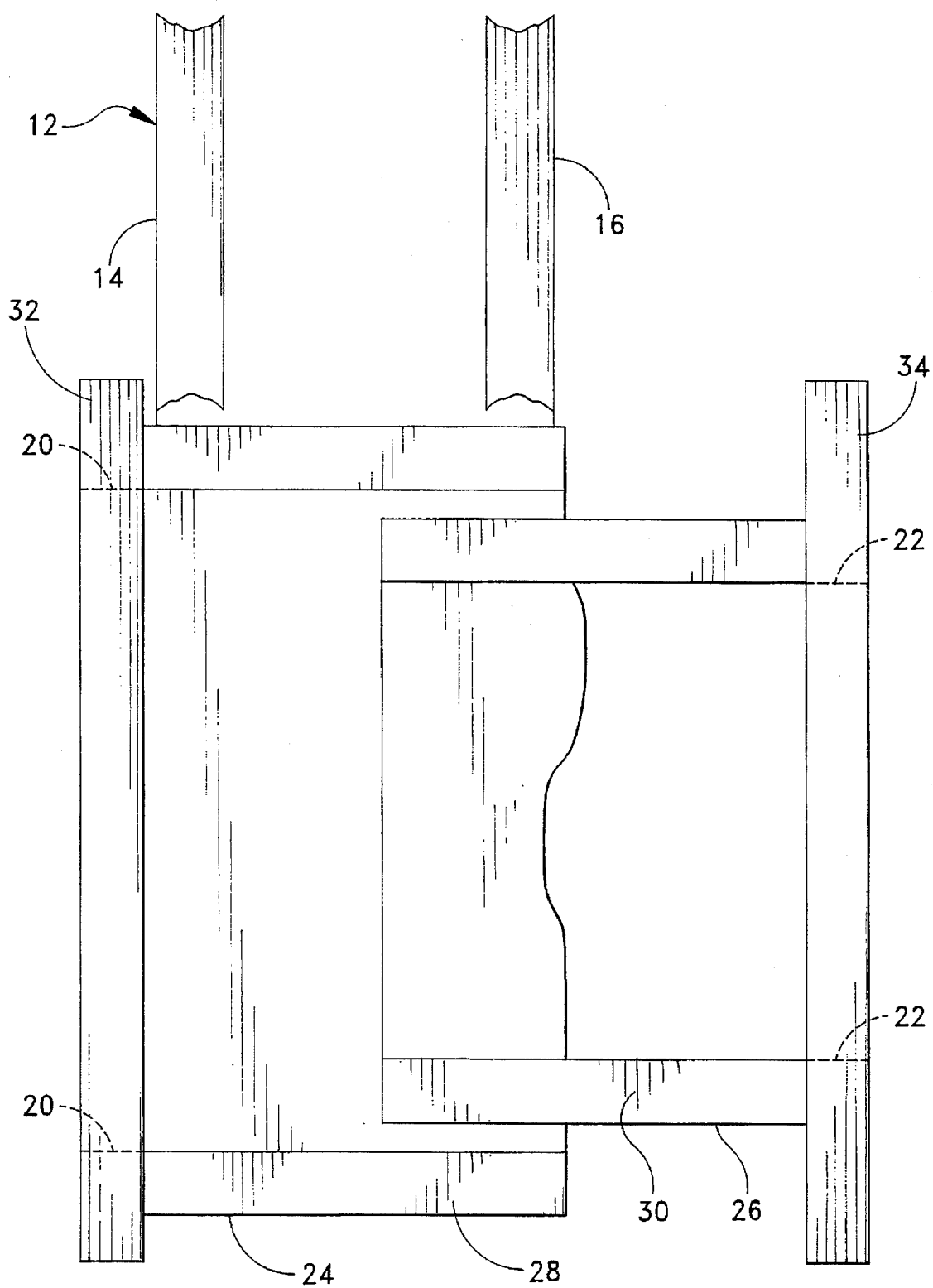
FIG. 2 is a sectional view showing the manner in which the normally open passageway may be formed within the wall structure of the enclosure.
Figure 3:
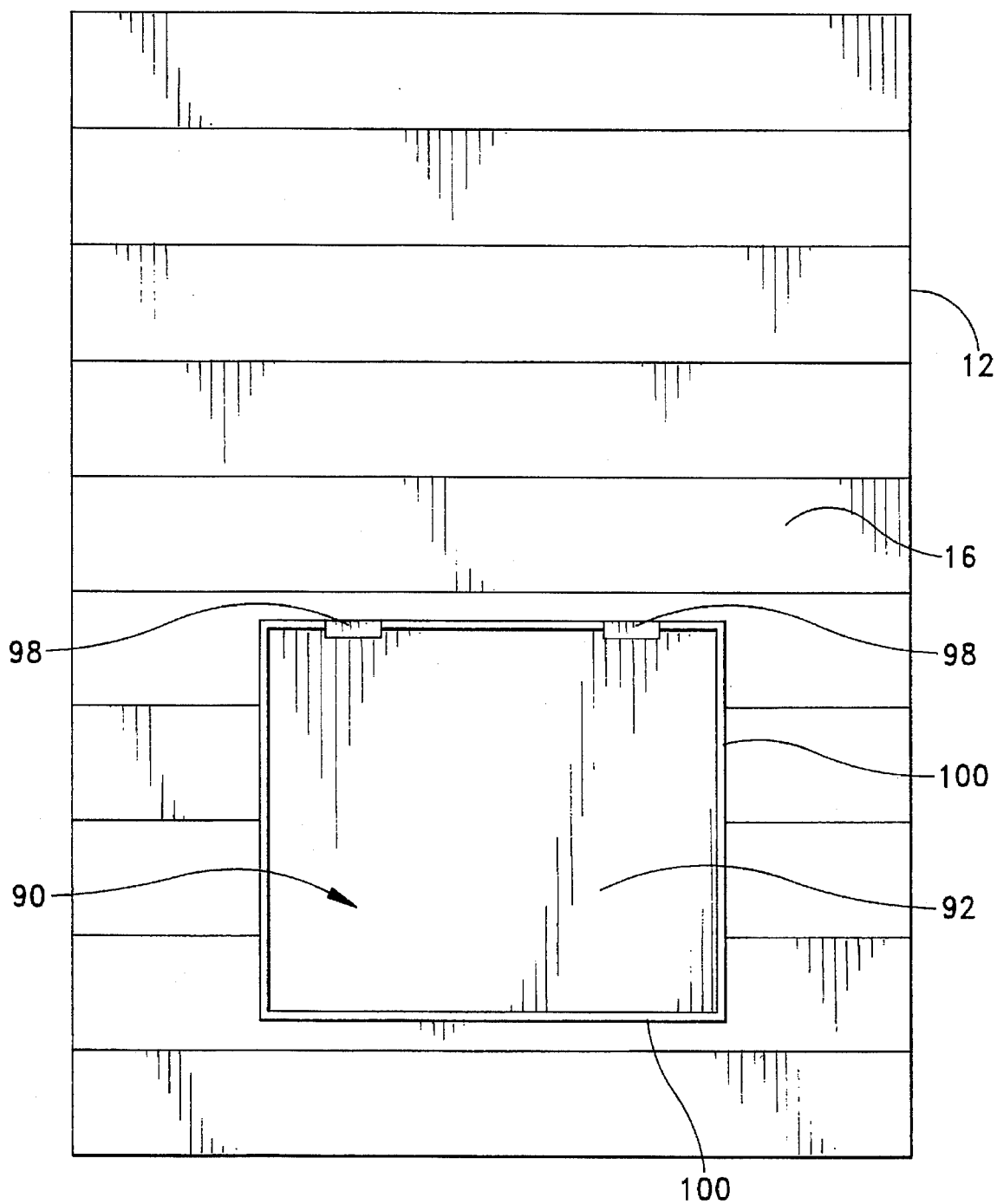
FIG. 3 is a rear elevational view taken from the outside of the enclosure.
Figure 4:
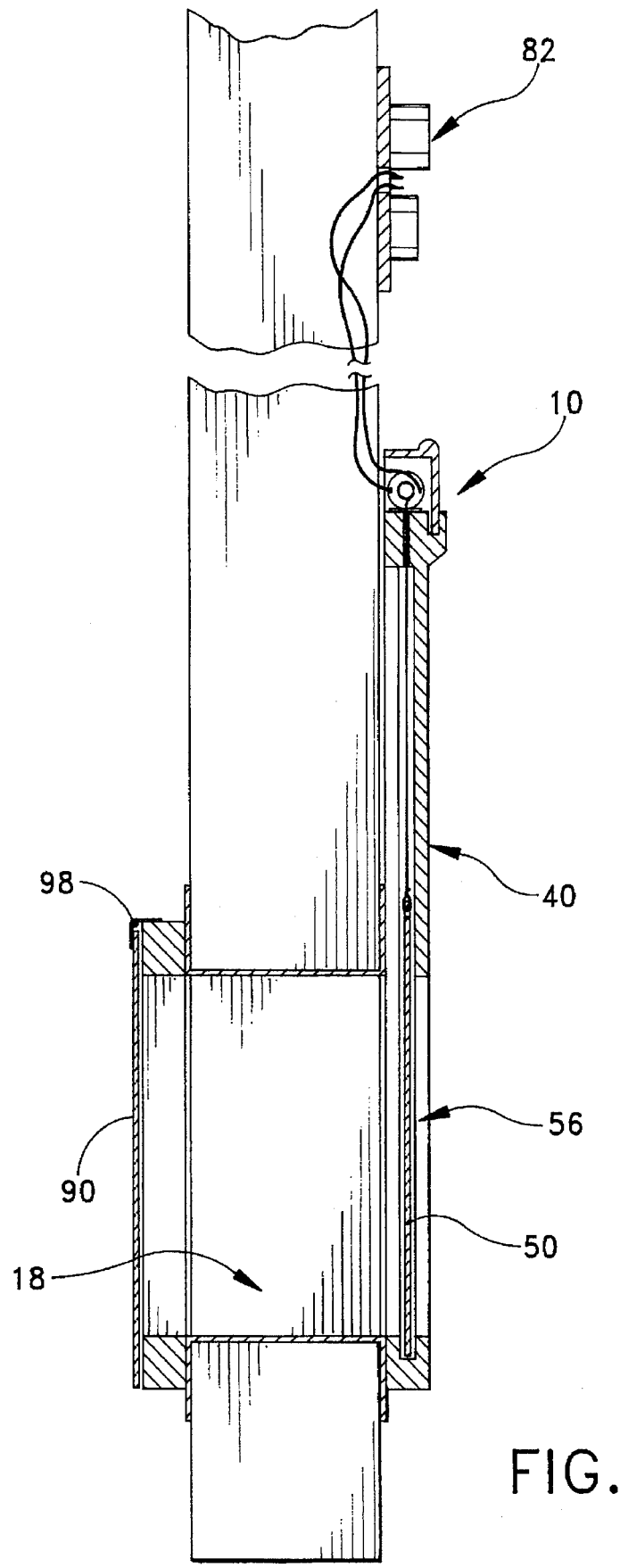
FIGS. 4 and 5 are cross-sectional views taken along the line 4—4 of FIG. 1 showing the manner of operation of the device.

Referring now to the drawings, the device 10 of the present invention is adapted to be mounted on and partly within a wall in part defining an enclosure such as a house or the like. Although the description of the invention will be made with respect to a conventionally studded wall such as found in modernly constructed houses, it should be pointed out that other walls or even doors may be utilized to accommodate the present device. The wall 12 thus includes an inside surface 14, an outside surface 16 laterally separated therefrom and a normally open passageway 18 therethrough. Such passageway 18 is open and includes an inside entrance 20 and an outside exit 22. One manner in which such passageway 18 may be formed is shown in FIG. 2 of the drawings in which a pair of telescoping members 24 and 26 are depicted in preliminary positioning with respect to the wall 12. Such members 24, 26 may be formed from any material including sheet metal and comprise forward projections or bosses 28 and 30 respectively which are generally of rectangular cross-sectional configuration assuming a rectangular opening 18 although any shaped passage 18 may be provided and which, in essence, provides a clean peripheral defining surface through passageway 18 and one in which interior portions of the walls 14 and 16 which may contain insulation, studding and the like are hidden from view. It should be pointed out that the essential feature is that a suitable passageway 18 is provided through the enclosure wall rather than the shape of the passageway except to the extent that the passage 18 should be provided at such a height above the floor of the enclosure and of such a cross-sectional area that the passageway will provide for the pet's easy egress therethrough. Obviously if there is more than one pet within the enclosure to be considered, then the dimensions of the passage should be such to easily accommodate the egress of the largest of such pets.

Additionally, the members 24, 26 may be provided with flange portions 32, 34 which when placed in abutting contact with the surfaces 14 and 16 can provide the means whereby such members 24, 26 can be attached to the walls 14, 16 via conventional fastening devices such as screws and the like.

Mounted as by screws 39 or otherwise positioned on the inside wall 14 is a frame 40 having sides 42 and 44 in which a pair of opposed grooves 46, 48 are formed for receipt of a primary door 50. Such door 50 is normally in the form of a generally planar panel having opposed edges 52, 54 which are adapted for receipt in the grooves 46, 48. It being further pointed out that the frame 40 includes an opening 56 defined thereby and normally closed by such primary door 50. It should also be pointed out that the frame 40 extends above the opening 56 a distance generally approximating the height of the opening 56 and of the door 50 such that upon an emergency the door 50 may be raised within the grooves 46, 48 to a upper open position in which the passageway is unobstructed by the primary door 50.

To activate the above movement of the door 50, an electrical motor 60 is conveniently positioned on the upper wall 62 of the frame. Such motor includes a capstan 64 on which a cord 66 is attached at one end thereof. The other cord end 66 is attached to an upper portion of the door 50 such that upon rotation of the motor 60, the capstan winds the cord 66 thereon thus elevating the door within the confines of the grooves 46, 48 to its upper open position. It should be pointed out that in referring to the invention as vertically oriented does not limit its potential use in, for instance, a side to side lateral position wherein the motor, in effect, would move the door to one side so as to provide open access to the passageway 18. Such lateral disposition could present problems in modern construction in that it would take up additional space and would require some other mechanism other than gravity to enable the door to return to its normally closed position upon the cessation of the emergency. With such regard, it should be pointed out that the motor 60 while activated will continue to maintain the door in the open position although safety catches (not shown) could be included to provide for maintaining the door in its upper position once the door has passed such means during its upward travel.

Conveniently mounted adjacent the motor 60 upon the top surface 62 of the frame 40 is at least the speaker portion 70 of an audio signal device 72 such as a tape recorder and player. The surface 62 may be covered by cover 65 which additionally hides the motor 60 as well as the audio device 72 or at least the speaker portion 70 thereof as well. Such player 72 includes a pre-recorded message preferably made in the pet owner's voice which when the escape device is activated commences the playing of the audio device 72 such that the pet is directed to the emergency exit by the owner's voice and/or commands. Obviously, the initiation of the voice aspect of the subject escape device should be made either as the motor is lifting the primary door 50 to its open position or after the door has reached such point as by a secondary activation switch (not shown) since one would not want the pet to be prematurely led to the escape device prior to free access being provided through the passageway. Suitable messages for the pets could be as follows: "Here Simba, come get your din din. Good kitty, Simba" (for cats): or "Vinny, come boy, come. Let's go, Vinny." (for dogs).

The device of the present invention is further provided with a detection activation and power supply unit. Such may be placed conveniently on the wall 14 above the device or otherwise suitably positioned such that the smoke detector portion or unit 82 thereof is suitably positioned for its purpose—that of detecting the presence of smoke within the enclosure. Once the smoke detector unit 82 detects smoke, such through suitable circuitry activates the motor 60. Normally, the smoke detector 82 is battery powered and the battery 84 for such purpose may be utilized to power the motor 60 or a separate battery may be provided for such purposes. Normally nine volt disposable batteries are provided for such purposes. Appropriate wires 86 connect the power source, i.e., the batteries, in the unit to the motor 60 as by passage through the enclosure wall or otherwise. Additionally, the wires 86 serve to connect the audio signal device 72 to the power source within the unit. Preferably, the audio signal device 72 is activated sequentially, that is, the detection of smoke by the smoke detector 82 initiates activation of the door 50 to its upper position and thereafter the circuitry of the device commences the audio signal device 72 such that the message is played through the speaker 70. Obviously, it is preferable that the message be repeated, that is, that it be recorded repetitiously, so that the audio signal device continues to play the appropriate message and that the speaker be mounted in a position proximal to the door and open passageway 18 such that familiar commands in the pet owner's voice in combination with the open passageway increases the chance of successful egress of the pet or pets. It should also be pointed out that when two or more pets are housed within the enclosure, suitable messages for each pet may be alternatively played by the audio signal device 72. Also, the conventional alarm sounds associated with smoke detectors should preferably not be associated with this device since such sounds could confuse the pets.

Figure 5:
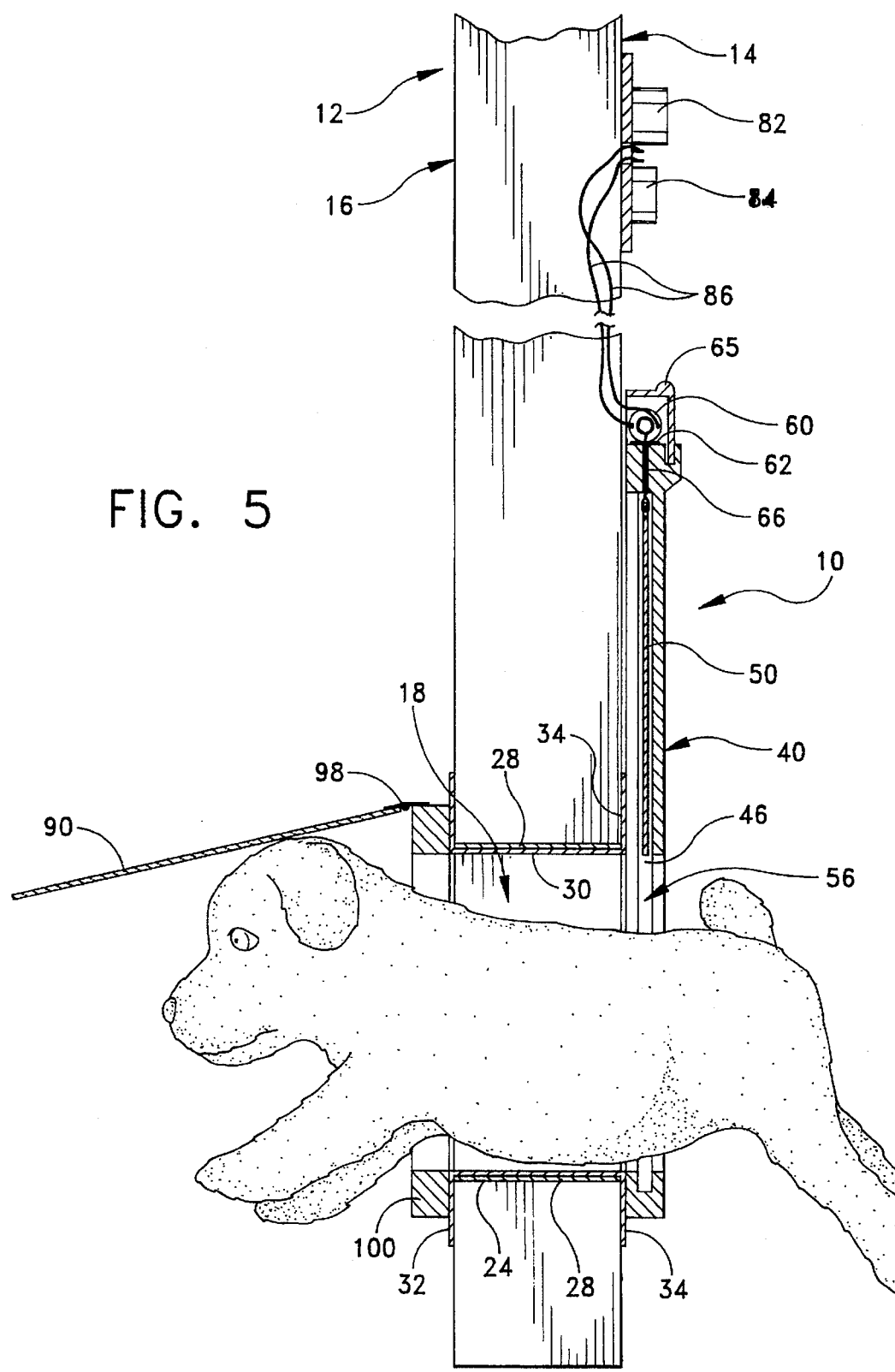

In some cases, it is preferable to provide a secondary door 90 on the outside of the passageway such that once the pet has moved through the open passageway as during an emergency, the secondary door prevents the mistaken return of the pet to the enclosure. Such secondary door may be in the form of a panel 92 hingedly connected to the top of an outer portion of the frame which projects outwardly of the outer wall 16. The panel 92 is thus free to move to a open position such as shown in FIG. 5 of the drawings by the pet's pushing action moving through the passageway 18 and thence closing the panel 92 behind the pet. The panel 92 should be of a sufficiently large extent such that peripheral inside portions thereof contact the outer portions of a frame 100 for such purpose. Preferably, the panel 92 should be made of a material which is at least translucent and preferably transparent such that the pet can see to the outside. Such panel furthermore reduces the chance of weather driven rain, cold, etc. from reaching interior portions of the enclosure. Suitable mounting of the panel 92 includes a pair of laterally spaced hinges 98.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An escape device for pets housed within an enclosure such as a house upon the occasion of a smoke emitting emergency such as a fire in such enclosure and wherein the enclosure is defined by a plurality of walls and wherein one of the walls includes an open passage therethrough disposed at a height and dimensioned so as to accommodate the passage therethrough of a pet including cats and dogs from said enclosure to the outside thereof, said device comprising a door normally positioned so as to close said open passage, opening means to open said door operatively attached to said door, a smoke detector operatively connected with said door opening means such that upon sensing smoke said detector activates said door opening means to open said door and enable the free egress of the pet through the passageway to the outside of the enclosure and means for playing a pre-recorded audible voice message from a person familiar to the pet initiated by the activation of said smoke alarm so as to urge the pet towards and through the open passageway.

2. The device of claim 1, wherein said door opening means and said smoke detector both being electrically powered.

3. The device of claim 2, wherein the electrical power source for said door opening means being a battery.

4. The device of claim 2, wherein said door opening means being a rotary motor having a capstan which includes a cord with opposed ends wherein one end is attached thereto and adapted to wound thereon upon operation of the motor and wherein the other end is attached to the door so as to move said door from its closed position to its open position.

5. The device of claim 1, wherein said door being in the form of a generally planar panel and said device further including a frame member slidably supporting said door, said frame member having an opening aligned with said passageway and opposed guides which receives opposed edge portions of the door, said door opening means adapted to move said door panel along said opposed guides.

6. The device of claim 5, wherein said door and said frame member are vertically aligned such that the door panel is disposed in a lowermost closed position by gravity when the door opening means is not activated.

7. The device of claim 1, wherein there is a secondary door, said second door mounted, for one way pivotal movement with respect to the open passage, at the outside of the enclosure so as to fully permit pivotal movement thereof to permit egress but to be normally positioned to close said passage so as to prevent return of the pet to the enclosure through said passage.

8. The device of claim 7, said secondary door being at least partially transparent such that the pet can visually see therethrough.

9. The method of providing an escape to egress for pets housed within an enclosure such as a house upon the occasion of a smoke emitting emergency such as a fire in such enclosure and wherein the enclosure is defined by a plurality of walls and wherein one of the walls includes an open passage therethrough disposed at a height and dimensioned so as to accommodate the passage therethrough of a pet including cats and dogs from the enclosure to the outside thereof, and wherein the device includes a door normally positioned so as to close said open passage, opening means to open the door, a smoke detector operatively associated with the door opening means such that upon sensing smoke from the smoke emitting emergency the detector further activates the door opening means to open the door and enable the free egress of the pet through the passageway to the outside of the enclosure and means for playing a prerecorded audible voice message from a person familiar to the pet upon the activation of the smoke alarm and the door opening means so as to urge the pet towards and through the open passageway; comprising, the sequential steps of activating said smoke alarm, thereafter opening said door towards its open position and thereafter playing said prerecorded voice message so that such message is audible to the pet in a position proximal to said passage while maintaining said door in the open position.

* * * * *